Patented Aug. 22, 1950

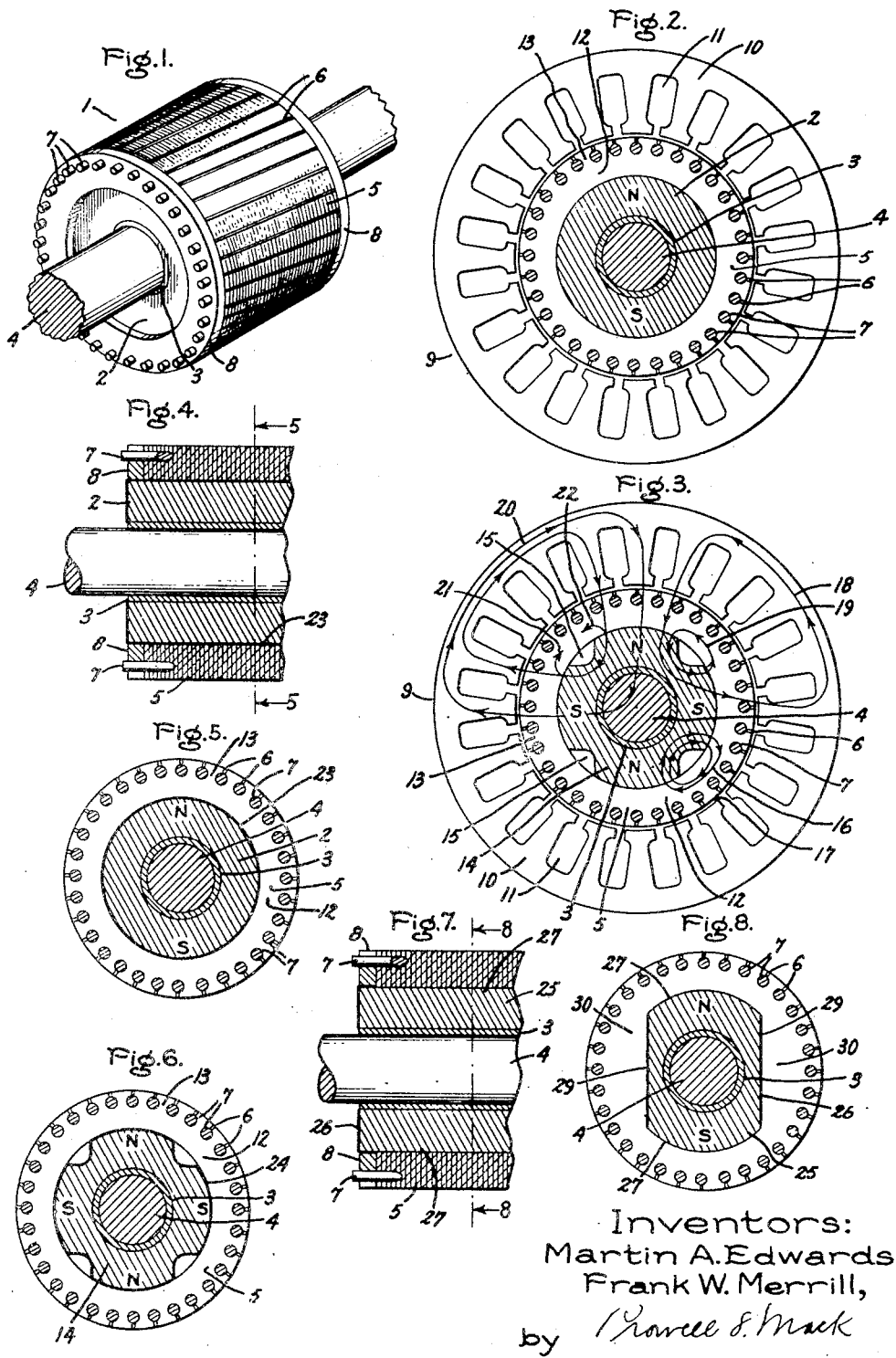

2,519,895

UNITED STATES PATENT OFFICE 2,519,895

ROTOR FOR DYNAMOELECTRIC MACHINES

Martin A. Edwards, Scotia, N. Y., and Frank W. Merrill, Fort Wayne, Ind., assignors to General Electric Company, a corporation of New York Application June 1, 1949, Serial No. 96,585

7 Claims. (Cl. 172—120)

This invention relates to rotors for dynamo-electric machines, and more particularly to rotors for synchronous induction motors having permanent magnet excitation.

Conventional synchronous motors are normally provided with a rotor having a certain number of direct current excited poles, the pole faces of which are usually supplied with squirrel cage bars and end rings to effect self starting and to dampen hunting. In motors of fractional horsepower frame sizes, however, it is often physically inconvenient to provide salient direct current excited poles and, accordingly, such motors may be provided with permanent magnet excited rotors as shown in Patent 2,303,893 to Friedrich Mullner, assigned to the assignee of the present application. Such motors include a stator member with a winding energized by alternating current and a rotor member having a permanent magnet surrounded by a laminated sleeve. Slots are provided in the outer surface of the sleeve in which squirrel cage bars are positioned, the bars being short-circuited by end rings forming a short-circuited winding for self starting.

In the design of such permanent magnet excited synchronous induction motors, it has been found necessary to arrange the squirrel cage bars so that the section of the sleeve under the bars is as radially thin as possible in order to produce a high initial flux density under the bars to secure synchronous rather than induction motor operation and also to insure that a substantial part of the permanent magnet flux is diverted to the stator at synchronism to effect maximum utilization of the permanent magnet material.

In addition, it has also been found desirable to provide a large number of closely spaced squirrel cage bars so that a high flux density in the restricted section of teeth between the bars is secured. There is a large demagnetizable influence on the permanent magnet when the motor is pulling in and out of synchronism due to large flux surges and these surges are sharply checked by the valve action of the restricted rotor teeth. Furthermore, at speeds other than synchronous, the alternating flux produced by the stator winding tends to demagnetize the permanent magnet and in addition, there is a further demagnetizing effect on the permanent magnet due to stator flux changes caused by sudden variations in the load or energizing voltage. The short-circuited squirrel cage winding has a powerful dampening effect on these demagnetizing forces which is usually sufficient to protect the permanent magnet. However, it may be found desirable to supplement an increase in protective action of the squirrel cage by providing additional means for dampening the stator flux variations.

An object of this invention is to provide an improved permanent magnet excited rotor for dynamoelectric machines.

Another object of this invention is to provide an improved permanent magnet excited rotor for synchronous induction motors with additional means for preventing demagnetization of the permanent magnet.

A further object of this invention is to provide an improved permanent magnet excited self-starting synchronous induction motor wherein maximum utilization is made of the permanent magnet material.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with one aspect of this invention, there is provided a permanent magnet excited rotor for a synchronous induction motor having a conventional stator member with appropriate windings thereon adapted to be energized by alternating current. The rotor comprises a permanent magnet mounted on a shaft formed of magnetic material and the magnet is polarized radially to respectively form polar areas at its outer surface. A laminated sleeve member is arranged around the permanent magnet and is provided with a plurality of slots in its outer surface in which a squirrel cage winding is positioned. By virtue of the squirrel cage winding, a motor provided with this rotor will start as an induction motor and the permanent magnet core will cause it to pull into step and run as a synchronous motor. The section of the laminated sleeve under the squirrel cage winding is made as radially thin as possible in order to secure a high initial flux density under the squirrel cage bars to insure synchronous rather than induction motor operation and to divert the maximum possible amount of permanent magnet flux to the stator at synchronism in order to effect the most efficient utilization of the permanent magnet material. A large number of closely spaced squirrel cage bars are provided so that a high flux density in the restricted sections of the teeth between the bars is secured in order to dampen flux surges while the motor is pulling in and out of synchronism.

In accordance with a further aspects of this invention, a thin layer of conductive material is formed around the circumferential surface and the ends of the permanent magnet; and the laminated sleeve together with the squirrel cage bars and end rings are in turn arranged around the permanent magnet. This thin layer of conductive material serves to further dampen the alternating flux produced by the stator winding at speeds other than synchronous or the stator flux changes caused by variations in the external magnetic circuit.

In the drawing, Fig. 1 is a perspective view of a permanent magnet rotor constructed in accordance with this invention; Fig. 2 is a cross-sectional view of the rotor of Fig. 1 arranged in a conventional stator; Fig. 3 is a cross-sectional view of a permanent magnet excited synchronous induction motor utilizing a four pole permanent magnet; Fig. 4 is a cross-sectional view of a permanent magnet excited synchronous induction motor rotor having a thin layer of conductive material arranged around the circumferential surface and the ends of the permanent magnet to further dampen uux variations which tend to demagnetize the magnet; Fig. 5 is a cross-sectional view of the embodiment of Fig. 4 taken along the line 5—5; Fig. 6 is a cross-sectional view of a four pole permanent magnet excited rotor with a thin layer of conductive material formed on the outer surface of the magnet for further dampening stator flux variations to protect the permanent magnet; Fig. 7 is a cross-sectional view of a permanent magnet excited synchronous induction motor of the type shown in Fig. 4 with the conductive material omitted from the surface of the permanent magnet in the region of the polar areas; and Fig. 8 is a cross-sectional view of the embodiment of Fig. 7 taken along the line 8—8.

Referring now to Figs. 1 and 2, there is shown a rotor member 1 having a cylindrical permanent magnet 2, preferably formed of a permanent magnet alloy of iron, nickel, cobalt, copper, titanium, and aluminum. The permanent magnet 2 is preferably cast around a sleeve member 3 of magnetic material, such as soft steel. This assembly is in turn pressed on to a shaft 4 formed of magnetic material, such as steel. The permanent magnet 2 is polarized radially to form polar areas at its outer surface, as shown in Fig. 2. While the permanent magnet 2 could be mounted directly on the shaft 4, the construction shown utilizing the magnet sleeve 3 is the preferred construction, it having been found impractical to press a cast permanent magnet of the type considered here directly onto a steel shaft since the permanent magnet material is so brittle that it will crack rather than yield in an elastic manner. Casting the permanent magnet material 2 around a steel tube 3 provides a soft center which may be turned to size instead of ground. The strength of the steel tube 3 and the slight clearance of its fit with the permanent magnet 2 also permits the assembly to be given a light press fit over the magnetic shaft 4. A cylindrical laminated sleeve member 5 formed of a plurality of relatively thin laminations of magnetic material, is arranged around cylindrical permanent magnet 2. The laminated sleeve member 5 is provided with a plurality of longitudinal slots 6 in its outer surface and a plurality of squirrel cage bars 7 formed of conductive material, such as aluminum, are positioned therein. A pair of conductive end rings 8 are provided to connect the squirrel cage bars 7 to form a short-circuited squirrel cage winding.

When the rotor 1, as described above, is positioned in a stator member 9, of any conventional type, which may be provided with a yoke section 10 and a plurality of winding slots 11 in which appropriate windings (not shown) adapted to be energized by alternating current are positioned, the motor will be self starting as an induction motor by virtue of the squirrel cage winding and will pull into step and run at synchronism as a synchronous motor on the unidirectional excitation provided by the permanent magnet 2.

In the construction of a rotor member in accordance with Figs. 1 and 2, it has been found desirable to fabricate the laminated sleeve member 5 so that the section 12 under the squirrel cage bars 7 is as radially thin as possible in order to produce a high initial flux density under the bars to secure synchronous rather than induction motor operation. Furthermore, the provision of a thin section 12 permits the use of the largest possible diameter permanent magnet 2. A flux density of 95,000 to 125,000 lines per square inch in section 12 produced by a flux density in the magnet of approximately 60,000 lines per square inch following magnetization of the rotor but prior to its assembly in the stator, was found to be desirable. It was found that an initial flux density in the section 12 less than 95,000 lines per square inch caused the motor power to decrease rapidly while a density over 125,000 lines per square inch caused the pull-in torque to fall off, brought no further gain in pull-out torque, and the power factor and efficiency decreased. Furthermore, if the section 12 underneath the squirrel cage bars 7 is comparatively wide, a considerable portion of the permanent magnet flux will be short-circuited. However, the provision of a thin section 12 provides a path of high reluctance around the permanent magnet 2 so that a substantial part of the permanent magnet flux is diverted to the stator at synchronism.

A sufficient number of squirrel cage bars 7 is provided and the bars are closely spaced so that the flux density in the restricted sections 13 of the teeth is high, i. e. on the order of 125,000 lines per square inch with normal motor flux at the maximum point of revolving field. This high flux density is permissible since there are no iron losses at synchronism due to the steady state of the revolving field flux. The length of the path of the restricted sections 13 is small with relation to the permanent magnet length available. Thus, the permanent magnet is protected from demagnetization, not only by the increased amount of conductive material in the bars, but surges of flux when the motor pulls in and out of synchronism are sharply checked by the valve action of the restricted rotor teeth.

The presence of the sleeve 3 and shaft 4 of magnetic material through the center of the permanent magnet 2 allows the main magnetic flux to pass directly through the center of the shaft which has the effect of increasing the central magnet area by the projected shaft area.

Referring now to Fig. 3, in which like elements are indicated by like reference numerals, there is shown a permanent magnet excited synchronous induction motor having four pole excitation. Here, a permanent magnet 14 is mounted on and in intimate contact with the sleeve 3 formed of magnetic material, such as a soft steel, which in turn is pressed on the steel shaft 4. The permanent magnet 14 is polarized radially to form polar areas, as shown, at its outer periphery. The four interpolar cored-out areas 15 are provided to save permanent magnet material and reduce leakage. A cylindrical sleeve member 5 formed of a plurality of relatively thin laminations of magnetic material is arranged around the permanent magnet 14 and a plurality of longitudinal slots 6 are formed in its outer surface with a plurality of squirrel cage bars 7 respectively positioned therein, end rings being provided to short-circuit the squirrel cage bars 7 to form a complete short-circuiting squirrel cage winding, as in Fig. 1. The rotor member is positioned in the stator member 9 having a yoke portion 10 and a plurality of winding slots 11 in which conventional alternating current energized windings (not shown) may be positioned.

In manufacturing, the permanent magnet 2 or 14 is suitably secured to the sleeve 3 and shaft 4; and the laminated sleeve member including the squirrel cage bars 7 and end rings 8, is then assembled. In Fig. 1, the squirrel cage slots 6 are shown skewed about 15°. However, it can be readily understood that they may be angled by any other amount in accordance with conventional practice. The entire rotor assembly is then placed in a suitable two or four pole magnetizer and saturation flux applied to produce the polar areas. Referring specifically to Fig. 3, although it is to be readily understood that the same phenomenon occurs in the embodiment of Fig. 2, the permanent magnet flux will traverse the section 12 under the squirrel cage bars 7, as shown at 16 in Fig. 3. This flux has a high density by virtue of the thin radial dimension of the section 12. When the rotor is positioned in the stator 10, the working air gap 17 having a lower reluctance than the section 12 of the laminated sleeve member 5, a considerable percentage of the permanent magnet flux will be diverted to the stator, as shown at 18, leaving only a small percentage of the permanent magnet flux traversing the section 12 of the sleeve member 4, as shown at 19. This drawing off of a large percentage of the permanent magnet flux lowers the flux density in the sleeve member 5 sufficiently to provide ample cross-section for the alternating starting flux from the stator windings which co-acts with the squirrel cage bars 7 to produce the starting torque. Thus, a motor provided with the rotor of Figs. 1 and 2 or 3 will start as an induction motor with even starting torque. When the rotor speed reaches synchronism, the permanent magnet flux joins the stator revolving field flux as shown at 20. At synchronism, due to the provision of the radially thin section 12 of the sleeve member 5, there is little tendency for the permanent magnet flux to be short-circuited through the sleeve member. Furthermore, at synchronism, the M. M. F.'s of the permanent magnet flux and the stator revolving field flux in the sleeve member are opposed, as shown at 21 and 22, further limiting the short-circuiting of the permanent magnet flux through the sleeve member 5. Thus, at synchronism, substantially all of the permanent magnet flux is diverted through the stator and the permanent magnet 14 essentially provides the principal excitation for the motor.

As described above, it is desirable that the section 12 of the laminated sleeve member 4 be of such radial thickness that the flux density therein due to the magnet flux alone, prior to insertion of the rotor in the stator, be between 95,000 and 125,000 lines per square inch; for a flux density in the magnet of approximately 60,000 lines per square inch. It has been found that a thinner radial section 12 producing higher flux density therein may provide slight increases in pull-out torque, efficiency and power factor, by reducing the permanent magnet flux leakage at synchronism through the sleeve member 4 to a minimum. However, the pull-in torque and starting torque, are reduced and the level of the minor hysteresis loop of the permanent magnet may be decreased by an excessive amount when the rotor is removed from the magnetizer. The flux density as indicated above has been found to provide the maximum performance for output, efficiency and power factor without seriously reducing the pull-in and starting torques or the minor hysteresis loop level.

After the rotor member has been removed from the magnetizer, the permanent magnet flux as described above, initially traverses the section 12 of the laminated sleeve member 5 causing the flux density of the parmanent magnet to fall along a major hysteresis loop to a lower value determined by the reluctance of the section 12. When the rotor is assembled in the stator, by virtue of the lower reluctance of the working air gap 17 with respect to section 12 the permanent magnet flux density will rise with the operating point moving higher on the minor hysteresis loop already established by the reluctance of the section 12 of the laminated sleeve member 5. The section 12, therefore, acts as a shunt gap to maintain the flux density of the permanent magnet 2 at a high level when the rotor is not positioned in the stator. At synchronism, the flux density in the section 12 falls to a low value, the permanent magnet M. M. F. combining with that set up by the magnetizing component of the alternating current of the stator windings. Furthermore, the flux leakage at synchronism through the section 12 of the laminated sleeve member 5 is less than would be present at standstill or if the machine was operated as a generator since the opposed M. M. F.'s of the permanent magnet flux and the stator revolving field flux in the section 12 further reduce the permanent magnet flux leakage. If the permanent magnet is of sufficient strength, it will take over a large part of the excitation of the motor at synchronism, thus, producing a substantial increase in the power factor and efficiency. The cored-out areas 15 of the permanent magnet 14 of Fig. 3 are provided since the presence of the permanent magnet material under the highly saturated sections 12 of the laminated sleeve member 4 would aggravate or increase the leakage of the permanent magnet flux therethrough. As described above, a large number of closely spaced squirrel cage bars 7 are provided so that a high flux density in the restricted sections 13 of the teeth between the bars is secured in order to dampen surges of flux when the motor is pulling in or out of synchronism.

Referring now to Figs. 4 and 5 in which like elements are indicated by like reference numerals, there is shown a cylindrical permanent magnet 2 cast around a sleeve member 3 of magnetic material, such as soft steel, this assembly being in turn pressed onto the shaft 4, also formed of magnetic material, such as steel. The permanent magnet 2 is polarized radially to form polar areas at its outer surface, as shown in Fig. 5, and a thin layer 23 of conductive material, such as copper, is formed on the cylindrical surface and the ends of the permanent magnet 2, as by plating or spraying. A cylindrical laminated sleeve member 5 formed of a plurality of relatively thin laminations of magnetic material is arranged around the permanent magnet and is provided with a plurality of longitudinal slots 6 in its outer surface with squirrel cage bars 7 arranged therein. End rings 8 are provided to connect the squirrel cage bars 7 to form a complete short-circuited squirrel cage winding.

It can be readily seen that the alternating flux produced by the stator windings will traverse the permanent magnet 2 and at speeds other than synchronism, will tend to demagnetize the magnet. In addition, stator flux changes caused by variations in load or line voltage tend to produce a demagnetizing effect on the magnet. The relatively thin layer 23 of electrically conductive material formed on the circumferential surface and ends of the permanent magnet 2, and in contact with the end rings 8, serves to provide an additional dampening influence against the demagnetizing forces on the permanent magnet. In addition, the provision of the relatively thin layer 23 of electrically conductive material on the circumferential surface of the magnet serves to hold the laminations of the laminated sleeve 5 in place and eliminates the necessity for machining the circumferential surface of the permanent magnet 2 to provide the proper outside dimension since the necessary machining may be performed on the plated or sprayed copper. It should also be apparent that it would be possible to spray or plate a thin layer of magnetically conducting material such as iron or steel onto the surface of the magnet. This would also eliminate the necessity for machining the hard circumferential surface of the magnet and would insure a good magnetic joint of high permeability between the magnet and laminated sleeve 5.

Referring now to Fig. 6 in which like elements are indicated by like reference numerals, there is shown a four pole permanent magnet 14 mounted on a sleeve 3 and shaft 4 formed of magnetic material. The permanent magnet 14 is polarized radially to form polar areas at its outer surface, and a relatively thin layer 24 of conductive material, such as copper, is formed as by plating or spraying, on the circumferential surface of the permanent magnet and on the ends of the magnet. A cylindrical sleeve member 5 formed of a plurality of relatively thin laminations of magnetic material is arranged around the permanent magnet 14 and is provided with a plurality of longitudinal slots 6 in which squirrel cage bars 7 formed of conductive material are positioned. End rings (not shown) connect the squirrel cage bars 7 to form a single short-circuited squirrel cage winding and are in contact with a relatively thin layer 24 of conductive material. Here, as in the case of the embodiment of Figs. 4 and 5 the relatively thin layer 24 of conductive material serves to further dampen the alternating flux produced by the stator winding and the stator flux changes caused by variations in the external magnetic circuit to prevent demagnetization of the permanent magnet.

In the embodiments of Figs. 4, 5 and 6, as in the embodiment of Figs. 1, 2, and 3, it is desirable that the section 12 under the squirrel cage bars 7 be as radially thin as possible in order to produce a high initial flux density under the bars to secure synchronous rather than induction motor operation and to divert a substantial part of the permanent magnet flux to the stator at synchronism. The radial thickness of the section 12 should be such that a density of from 95,000 to 125,000 lines per square inch is produced by a flux density in the magnet of approximately 60,000 lines per square inch following magnetization of the rotor but prior to its assembly in the stator. As in the embodiments of Figs. 1, 2, and 3, the squirrel cage bars 7 are closely spaced so that a high flux density in the restricted sections 13 of the rotor teeth is secured, i. e., on the order of 125,000 lines per square inch with normal motor flux at the maximum point of revolving field. The arrangement, as indicated above, not only protects the permanent magnet 14 from demagnetizing influences due to stator flux changes by virtue of the increased amount of material in the squirrel cage bars, but also sharply checks flux surges when the motor pulls in or out of synchronism.

Referring now to Figs. 7 and 8 in which like elements are indicated by like reference numerals, there is shown a permanent magnet 25 cast around a sleeve 3, formed of magnetic material, such as soft steel, which in turn is pressed onto the shaft 4, formed of magnetic material, such as steel. The magnet is polarized radially to form polar areas 27 at its outer surface, as shown. A relatively thin layer of conducting material 26, such as copper, is formed, as by plating or spraying, on the outer surface of the permanent magnet 25 and on the ends thereof. The relatively thin layer 26 of conductive material is omitted, however, in the area of the polar regions 27. A laminated sleeve member 5 having a plurality of longitudinal slots 6 with squirrel cage bars 7 positioned therein is arranged around the permanent magnet 25. End rings 8 connect with squirrel cage bars 7 to form a complete short-circuited squirrel cage winding and contact the relatively thin layer of conductive material 26. In this embodiment the permanent magnet 25 is shown as being formed with flat parallel sides 29 providing sections 30 of increased radial depth for the laminations of the laminated sleeve 5. This arrangement permits the maximum utilization of permanent magnet material.

It may be found that the introduction of an air gap between the polar areas 27 of the magnet and the adjacent areas of the laminated sleeve member 5, by virtue of the formation of the relatively thin layer of conductive material on the circumferential surface of the magnet, may result in the reduction of the magnet minor loop. Therefore, the construction of Figs. 7 and 8 may be utilized wherein the relatively thin layer of conductive material 26 is omitted in the region of the polar areas of the permanent magnet 25. This arrangement still provides the additional dampening protection necessary without the introduction of an air gap between the permanent magnet and the laminated sleeve member.

It will also be evident that any of the rotor constructions shown in the drawing, when assembled in a stator and with the flux distributed as shown at 18 in Fig. 3, may be driven externally at any speed and will thus generate a voltage in the stator winding. The improved rotor construction of this invention may therefore be utilized as a generator since the permanent magnet is protected against the demagnetizing effects of stator flux variations caused by sudden changes in load.

It will now be readily apparent that this invention provides an improved permanent magnet excited dynamo-electric machine wherein optimum performance is obtainable with the minimum amount of permanent magnet material.

While we have illustrated and described a particular embodiment of this invention, modifications thereof will occur to those skilled in the art. We desire it to be understood, therefore, that this invention is not to be limited to the particular arrangement disclosed, and we intend in the appended claims to cover all modifications which do not depart from the spirit and scope of the invention.

What we claim as new and desire to secure by Letters Patent of the United States is:

1. In a dynamoelectric machine, a rotor member comprising a permanent magnet mounted on a shaft formed of magnetic material and polarized radially to form polar areas at its outer surface, a laminated sleeve member arranged around said permanent magnet and having a plurality of slots formed in its outer surface, a plurality of squirrel cage winding conductors respectively positioned in said slots, and means for short-circuiting said conductors, the section of said laminated sleeve member under said bars being of such radial depth that a magnet flux density of from 95,000 to 125,000 lines per square inch is produced by a flux density in said permanent magnet of approximately 60,000 lines per square inch before said rotor member is positioned in the stator of said machine.

2. In a synchronous induction motor having a stator member provided with a winding adapted to be energized by alternating current, a rotor member comprising a permanent magnet mounted on a shaft formed of magnetic material and polarized radially to form polar areas at its outer surface, a relatively thin layer of electrically conductive material formed on the circumferential surface of said permanent magnet, a sleeve member formed of a plurality of relatively thin laminations of magnetic material arranged around said permanent magnet and having a plurality of slots formed in its outer surface, a plurality of squirrel cage winding conductors respectively positioned in said slots, and means for short-circuiting said conductors, said relatively thin layer of conductive material dampening alternating flux produced by said stator winding when said rotor is not running in synchronism whereby demagnetization of said magnet is prevented, the section of said laminated sleeve member under said bars being of such radial depth that a magnet flux density of from 95,000 to 125,000 lines per square inch is produced by a flux density in said permanent magnet of approximately 60,000 lines per square inch before said rotor member is positioned in said stator.

3. In a synchronous induction motor, a rotor member comprising a permanent magnet mounted on a shaft formed of magnetic material and polarized radially to form a plurality of pairs of polar areas at its outer surface, a laminated sleeve member arranged around said permanent magnet and having a plurality of slots formed in its outer surface, a plurality of squirrel cage winding conductors respectively positioned in said slots, and means for short-circuiting said conductors, the section of said laminated sleeve member under said bars being of such radial depth that a magnet flux density of from 95,000 to 125,000 lines per square inch is produced by a flux density in said permanent magnet of approximately 60,000 lines per square inch before said rotor member is positioned in the stator of said motor.

4. In a synchronous induction motor, a rotor member comprising a permanent magnet mounted on a shaft formed of magnetic material and polarized radially to form polar areas at its outer surface, a laminated sleeve member arranged around said permanent magnet and having a plurality of slots formed in its outer surface defining rotor teeth therebetween, a plurality of squirrel cage winding conductors respectively positioned in said slots, and means for short-circuiting said conductors, the sections of said rotor teeth between said squirrel cage conductors being of such width that the flux density therein is sufficiently high to dampen flux surges when the motor pulls in or out of synchronism.

5. In a synchronous induction motor, a rotor member comprising a permanent magnet mounted on a shaft formed of magnetic material and polarized radially to form polar areas at its outer surface, a laminated sleeve member arranged around said permanent magnet and having a plurality of slots formed in its outer surface defining rotor teeth therebetween, a plurality of squirrel cage winding conductors respectively positioned in said slots, and means for short-circuiting said conductors, the sections of said rotor teeth intermediate said squirrel cage conductors being of such width that a flux density on the order of 125,000 lines per square inch is produced therein at the maximum point of revolving field with a flux density in said permanent magnet of approximately 60,000 lines per square inch whereby flux surges when said motor is pulling in or out of said synchronism are dampened.

6. In a synchronous induction motor, a rotor member comprising a permanent magnet mounted on a shaft formed of magnetic material and polarized radially to form polar areas at its outer surface, a laminated sleeve member arranged around said permanent magnet and having a plurality of slots formed in its outer surface defining rotor teeth therebetween, a plurality of squirrel cage winding conductors respectively positioned in said slots, and means for short-circuiting said conductors, the section of said laminated sleeve member under said bars being of such radial depth that a magnet flux density of from 95,000 to 125,000 lines per square inch is produced by a flux density in said permanent magnet of approximately 60,000 lines per square inch before said rotor member is positioned in the stator of said motor, the sections of said rotor teeth intermediate said squirrel cage winding conductors being of such width that a flux density therein on the order of 125,000 lines per square inch will be produced at the maximum point of the revolving field with a flux density in said permanent magnet of approximately 60,000 lines per square inch whereby flux surges when said motor pulls into or out of synchronism are dampened.

7. In a synchronous induction motor, a rotor member comprising a permanent magnet mounted on a shaft formed of magnetic material and polarized radially to form polar areas at its outer surface, a relatively thin layer of electrically conductive material formed on the circumferential surface of said permanent magnet, a laminated sleeve member arranged around said permanent magnet and having a plurality of slots formed in its outer surface defining rotor teeth therebetween, a plurality of squirrel cage winding conductors respectively positioned in said slots, and means for short-circuiting said conductors, the section of said laminated sleeve member under said bars being of such radial depth that a magnet flux density of from 95,000 to 125,000 lines per square inch is produced by a flux density in said permanent magnet of approximately 60,000 lines per square inch before said rotor member is positioned in the stator of said motor, the sections of said rotor teeth intermediate said squirrel cage winding conductors being of such width that a flux density therein on the order of 125,000 lines per square inch will be produced at the maximum point of the revolving field with a flux density in said permanent magnet of approximately 60,000 lines per square inch whereby flux surges when said motor pulls into or out of synchronism are dampened, said relatively thin layer of conducting material on said permanent magnet dampening alternating flux produced by said stator winding when said rotor is not running in synchronism whereby demagnetization of said magnet is prevented.

MARTIN A. EDWARDS.
FRANK W. MERRILL.

REFERENCES CITED

The following references are of record in the file of this patent:

UNITED STATES PATENTS

| Number | Name | Date |
|---|---|---|
| 2,078,805 | Merrill | Apr. 27, 1937 |
| 2,303,893 | Mullner | Dec. 1, 1942 |
| 2,432,436 | Morrill | Dec. 9, 1947 |